Figure 1:
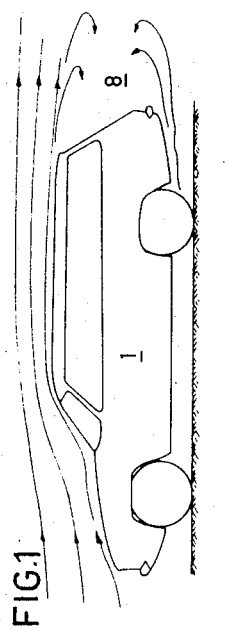

United States Patent [19]

Ridder et al.

[11] 3,724,892
[45] Apr. 3, 1973

[54] VEHICLE, ESPECIALLY A STATION WAGON, HAVING A VORTEX GENERATOR FOR PRODUCING AN ATTACHED FLOW OVER THE REAR WINDOW

[76] Inventors: Georg Sven-Olof Ridder, Fregattvagen 12, Lidingo; Hans Göran Lorinder, Vattentornsvagen 1, Osterskar, both of Sweden

[22] Filed: Feb. 8, 1971

[21] Appl. No.: 113,239

[30] Foreign Application Priority Data

Feb. 17, 1970 Sweden...................................2014/70

[52] U.S. Cl. .................................................296/1 S
[51] Int. Cl. ...............................................B62d 35/00
[58] Field of Search ..........296/1 S, 1 R, 91; 105/2 R, 105/2 A; 188/270

[56] References Cited

UNITED STATES PATENTS

| | | | |
|---|---|---|---|
| 3,529,862 | 9/1970 | Jousserandot | 296/1 S |
| 2,208,075 | 7/1940 | Jabelman | 296/1 S |
| 3,000,663 | 9/1961 | Lucchesi | 296/91 X |
| 3,059,562 | 10/1962 | Sturtevant | 296/91 X |

FOREIGN PATENTS OR APPLICATIONS

| | | | |
|---|---|---|---|
| 807,292 | 10/1936 | France | 296/1 S |
| 1,336,673 | 7/1963 | France | 296/1 S |
| 556,636 | 2/1957 | Italy | 296/1 S |

Primary Examiner—Kenneth H. Betts
Assistant Examiner—John A. Pekar
Attorney—Young & Thompson

[57] ABSTRACT

The present invention relates to a vehicle, particularly a station wagon, having vortex generators for producing an attached flow over the rear window and/or tailgate in order to overcome the problem of the vehicle's own tires throwing up slush which quickly covers the rear section of the vehicle, and the front part of vehicles following behind, with a layer of dirt. The vortex generators are designed to reduce the boundary layer of the air flow along the vehicle's rearward roof surface, gently curved shoulder surface and an obliquely slanted first surface so that separation is prevented over these surfaces and so that an attached flow can be maintained over same. In this way, the turbulent recirculation flow (base flow) will occur only outside of and downstream of a vertical second boundary surface. The vortex generators are a row of substantially rectangular sheets substantially perpendicular to the vehicle roof surface and disposed in pairs that are rearwardly alternately inclined with each sheet forming an angle of no more than 30° with the longitudinal direction of the vehicle.

3 Claims, 8 Drawing Figures

PATENTED APR 3 1973 3,724,892

INVENTORS
GEORG SVEN-OLOF RIDDER
HANS GÖRAN LORINDER
BY
Young & Thompson
ATTYS.

VEHICLE, ESPECIALLY A STATION WAGON, HAVING A VORTEX GENERATOR FOR PRODUCING AN ATTACHED FLOW OVER THE REAR WINDOW

The present invention relates to a vehicle, particularly a station wagon or the like, whose rear end has two transverse, essentially plane or gently curved outer boundary surfaces. The first of these surfaces is placed above the second one and constitutes a transition surface between the roof of the vehicle and the second surface.

When a vehicle is driven on slushy roads, it is a known fact that the vehicle's own tires throw up slush which quickly produces excessive dirtying of the rear section of the vehicle, especially its tail end. However, this dirtying is not limited to the vehicle in question. The innumerable small drops of slush generated by the tires produce a mist over the road surface, especially on busy roads. This mist leads in turn to the dirtying of the cars following behind. As is known, the now increasing practice of salt-sanding results in the above mentioned dirt problem being much more noticeable, particularly from the standpoint of traffic safety since the rear vision through the rear view mirror is more or less obscured by a dirtied rear window.

The automobile industry is well aware of the factors which cause vehicles to be subjected to this dirtying. The most important factor by far in this connection is the design of the back section of the vehicle since it is mainly this part of the car that concerns the air flow immediately adjacent to and outside of the rear transverse boundary surface. Consequently, from a flow technique standpoint, the back section of the vehicle is inclined to be given a more or less pronounced streamlining in order to thereby prevent, or at least counter the tendency of the attached air flow to be separated. It is actually in the flow region, which is characterized by a separated flow, where recirculation flow occurs with ensuing vigorous turbulence. However, a more pronounced streamlining of the rear section of the vehicle cannot be combined any easier with the demand for acceptable space inside the vehicle, regardless of whether this space is intended solely for passengers or, as is the case in so-called station wagons, for passengers and/or goods. Since station wagons are often provided with a tailgate to allow for quick loading and unloading, and since they also have a roof which generally extends horizontally all the way back to the tailgate, it is obvious that this loss of rear streamlining results in total separation at the back edge of the roof. Thus, there is a large flow region at and behind the more or less vertical tailgate with recirculation flow and vigorous turbulence, or so-called base flow.

The mist of dirt particles and water produced by the vehicle tires can be easily transported and dispersed in this base flow, and the extremely irregular flow within this base flow region also results in most of the dirt particles being deposited over the entire tailgate. This quickly results in the window of the tailgate being completely covered by dirt. This constitutes a direct threat to traffic safety since the driver soon cannot see out the rear window.

The problem which the present invention intends to overcome is as follows. In a vehicle, especially a station wagon or the like, whose rear section has two transverse, essentially plane or gently curved outer boundary surfaces, the first of which being situated above the second and constituting a transition surface between the roof of the automobile and the second surface, the rear section of the vehicle must be so shaped that the air flow remains attached, when the car is in motion, over at least the boundary surface which comprises the rear window of the vehicle.

According to the invention, this problem is solved partly by a gently curved shoulder surface acting as a transition surface between the roof of the vehicle and the first boundary surface which slants obliquely down from the roof of the vehicle and which is provided with a (rear) window, and partly by making the second boundary surface essentially vertical. In this way, a number of vortex generators are placed in one or more rows across and on the roof surface of the vehicle and reduce the boundary layer of the air flow along the rearward roof surface, shoulder surface and the obliquely slanted first surface so that separation is prevented over these surfaces and an attached flow can be maintained over same. The turbulent recirculation flow (base flow) will thereby occur only outside of and downstream of the vertical second boundary surface.

The reason for choosing, according to the invention, to combine the inclination of the first surface with the introduction of a number of vortex generators, which are placed across the roof surface of the vehicle, is summarized as follows. In wind tunnel tests, it has been shown that when vortex generators are not used the first surface cannot be inclined more than approximately 20° relative to the horizontal plane to ensure that the flow will remain attached over this entire surface (and thereby over the rear window) within the entire speed range of the automobile. However, an arrangement with a similar weakly inclined upper boundary surface is not suitable for, e.g., a station wagon since it limits the height of the space set aside for goods in the back of the vehicle. In addition, it results in a rather complicated tailgate construction because of the substantial "break" of said tailgate construction. If, however, in accordance with the present invention, vortex generators are placed across the back part of the horizontal roof, it becomes possible to increase the inclination of the first surface to at least 45° before any risk of separation occurs. In this way, the horizontal roof can be extended further rearwards. This results in increased space for goods and a simpler tailgate construction.

In this context, it might be a good idea to summarily describe the task and operation of the vortex generators. When a vehicle is driven forwards, it is subjected to an air flow rearwardly relative to said vehicle. Thus, a so-called boundary layer is formed on, inter alia, the car roof. The boundary is a layer immediately adjacent to the surface and has a lower speed than the outside air flow. The thickness of the boundary layer increases in the flow direction and this increasing boundary layer thickness in turn causes an increase of the flow's tendency to separate during directional changes of the underlying surface, as in the abruptly "chopped off" rear section of a conventional station wagon or in the transition form a horizontal roof to an inclined surface. The vortex generators, which often consist of a pair of rectangular metal sheets that project out from the surface under the boundary layer and through said layer, generate relatively vigorous vertices in the air with their free outer edges outside of said boundary layer. This air flows past outside the boundary layer. The vortices hereby produce the following effect. Rapidly flowing air is forced down against the surface and into more or less stagnant flow of the boundary layer. This results in the stagnant flow being accelerated, mixed up and more or less "flushed" away in the downstream direction. Thus, an effective thinning of the boundary layer is hereby attained. This leads to substantially improved conditions for attached flow. As a result, the flow can be deflected at a greater angle without this leading to separation. It is hereby understood that the "deflection" does not of course occur instantaneously, but rather via a gently curved shoulder surface.

With an embodiment of the vehicle's rear section, in accordance with the present invention, attached flow over the entire rear window is produced as well as a lessening of the air resistance of the vehicle. This results in decreased use of motor fuel and thus decreased operating costs.

In a preferred embodiment of the invention, the vortex generators consist of a row of essentially rectangular, preferably plane sheets which are placed chiefly perpendicular to the car roof surface. The sheets are rearwardly inclined in pairs and face each other. Each sheet forms an acute angle, preferably less than 30°, with the longitudinal direction of the vehicle. The vortex generators can suitably have an L-shaped cross section and be fixed to the roof surface with spot welds or rivets through one of the level parts. In certain cases, it may instead be preferable to fix the L-shaped vortex generators with a flexible metal band that is fastened over the roof with the help of fasteners in both ends. These fasteners should preferably be of the same type used for fastening luggage racks.

Figure 2:
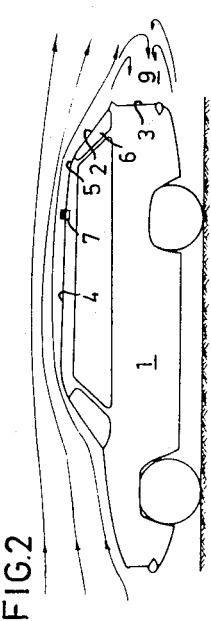
Figure 3:
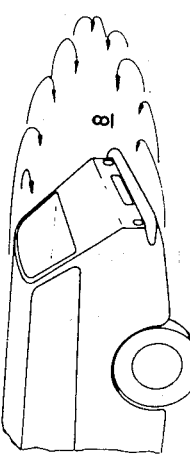
Figure 4:
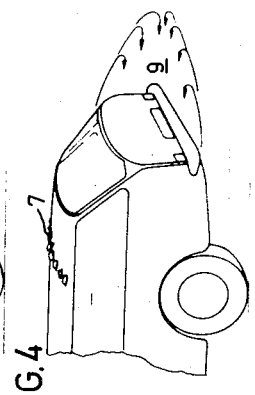
Figure 5:
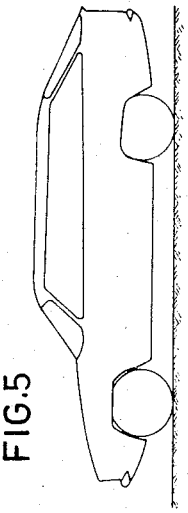
Figure 6:
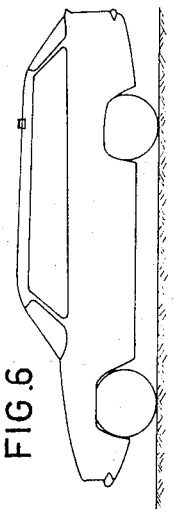
Figure 7:
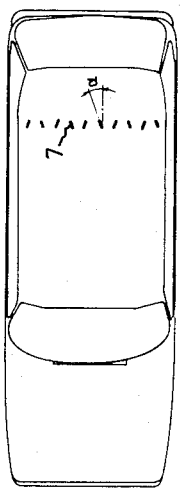
Figure 8:
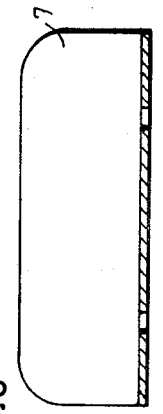

The invention will now be described further with reference to the drawing which illustrates, inter alia, some pronounced schematic flow diagrams of the rear section of both conventional station wagons and station wagons designed in accordance with the invention. FIG. 1 shows a side view of a conventional station wagon and the approximate air flow around the car at cruising speed and FIG. 2 shows a corresponding side view and flow diagram for a station wagon designed according to the invention. FIGS. 3 and 4 are perspective views of the rear section of the cars in FIGS. 1 and 2 respectively, FIG. 5 shows, for the sake of comparison, an automobile without any vortex generators but with its tailgate divided up into two parts, one inclined and the other vertical. FIG. 6 fully corresponds to FIG. 2 and is placed below FIG. 5 to facilitate a comparison. FIG. 7 shows a view from above of the station wagon in FIG. 6, and finally, FIG. 8 is a side view of a typical vortex generator sheet.

FIG. 1 shows a station wagon 1 having a conventional, abruptly chopped off rear section. As indicated in FIG. 3, the flow is also separated at the back edges of the vehicle's side surfaces. In the conventional vehicle, this separation results in the occurrence of a large flow region 8 with recirculation flow and vigorous turbulence — i.e., base flow — adjacent to and downstream from the chopped off rear section. Since dirt from the car tires can be easily carried and dispersed within this area, the tail end soon becomes heavily dirtied resulting in a loss of vision through the rear window 6. FIG. 2 shows the flow around a station wagon having a modified design according to the invention. In this case, the rear section has two transverse, essentially plane or gently curved outer boundary surfaces, the first of which 2 is located above the second one 3 and constitutes a transition surface between the vehicle's roof 4 and the surface 3. The transition between the roof 4 and the surface 2 is accomplished via a gently curved shoulder surface 5. On the back part of the roof 4 is a row of vortex generators 7 arranged across the roof (see FIGS. 2 and 4). The vortex generators produce an effective thinning out of the boundary layer so that the air flow over both the roof surface behind said vortex generators and the shoulder surface 5, and over the inclined surface 2, remains attached with no risk of separation arising. The base flow region 9 will thereby be limited to the area adjacent to and outside of the vertical second boundary surface 3. Thanks to the attached flow over the rear window 6 within the surface 2, a depositing of dirt particles on said rear window is prevented, even if the roads are damp and heavily dirtied. The vortex generators consist, e.g., of a row of essentially rectangular, preferably plane sheets 7 which are placed essentially perpendicular to the roof surface 4 of the vehicle, and which in pairs are rearwardly inclined facing each other, each one forming an acute angle $\alpha$ with the longitudinal direction of the car. Wind tunnel tests to date have shown that an angle of 15° to 20° is preferable in this connection. So that they can be easily and inexpensively made, the vortex generators can preferably consist of angular metal sleets (see FIG. 7) which are fastened to the roof surface by, e.g., spot welds or rivets through one of the level parts. As an alternative, it is also possible to secure the vortex generators on a flexible metal band which is fastened over the roof with the help of fasteners in both ends, said fasteners preferably being of the same type used for fastening common luggage racks. In a number of the wind tunnel tests carried out to date, vortex generators were used whose vertical vortex generating plane had the dimensions 2 × 6 cm and a sheet gauge of about 1 mm. These dimensions do not in any way define an optimally shaped vortex generator. A number of different structures, outer dimensions and sheet gauges are, of course, possible within the scope of the invention. A preferable optimum structure would depend on, inter alia, the roof shape of the vehicle in question, the inclination of the upper boundary surface, the curvature of the shoulder surface and the angle of inclination $\alpha$ of the vortex generator. FIG. 5 shows a station wagon which lacks vortex generators but which otherwise has a rear section with the same basic division as the vehicle according to the invention (see FIG. 6) — i.e., into an inclined and a vertical boundary surface. As mentioned above, when there are no vertex generators, inclination of the upper boundary surface of more than about 20° cannot be used. This is to make sure that the flow will remain attached over the whole rear window. As the figures reveal, this situation results in the substantially limited height of the rear part of the vehicle so that said vehicle has far less space for goods than a vehicle according to the invention.

What we claim is:

1. A vehicle whose rear section has two transverse, substantially plane or gently curved outer boundary surfaces, the first of which is located above the second and comprises a transition surface between the roof of the vehicle and the second surface there being a gently curved shoulder surface as a transition surface between the vehicle roof and the first boundary surface which slants obliquely down from said vehicle roof and a window therein, the second boundary surface being substantially vertical, and a plurality of vortex generators on and across the vehicle roof surface, said vortex generators comprising a row of substantially rectangular sheets substantially perpendicular to the vehicle roof surface, said sheets in pairs being rearwardly inclined facing each other, each sheet forming an acute angle not greater than 30° with the longitudinal direction of the vehicle, whereby said vortex generators reduce the boundary layer of the air flow along the rearward roof surface, shoulder surface, and obliquely slanted first surface so that separation is prevented over these surfaces and an attached flow can be maintained over the same whereby turbulent recirculation flow will occur only outside and downstream of the vertical second boundary surface.

2. A vehicle according to claim 1, in which the two boundary surfaces comprise the outer surface of a rear door of the vehicle, said vortex generators having an L-shaped cross section and being secured to the roof surface by fastening means.

3. A vehicle according to claim 1, in which said vortex generators have an L-shaped cross section and are secured by a flexible metal band which is fastened over the vehicle roof by means of fasteners at both ends.

* * * * *